(12) United States Patent
Richers et al.

(10) Patent No.: US 9,702,338 B2
(45) Date of Patent: Jul. 11, 2017

(54) DEVICE AND METHOD FOR MANUFACTURING A COMPONENT FOR ROTOR BLADE LIGHTNING PROTECTION

(75) Inventors: Tilman Richers, Kiel (DE); Lenz Simon Zeller, Kiel (DE); Kai Danekas, Lemwerder (DE)

(73) Assignees: Senvion SE, Hamburg (DE); Carbon Rotec GMBH & Co. KG, Lemwerder (DE)

(*) Notice: Subject to any disclaimer, the term of this patent is extended or adjusted under 35 U.S.C. 154(b) by 739 days.

(21) Appl. No.: 14/126,093

(22) PCT Filed: Jul. 10, 2012

(86) PCT No.: PCT/EP2012/002900
§ 371 (c)(1),
(2), (4) Date: Mar. 14, 2014

(87) PCT Pub. No.: WO2013/010645
PCT Pub. Date: Jan. 24, 2013

(65) Prior Publication Data
US 2014/0301857 A1    Oct. 9, 2014

(30) Foreign Application Priority Data
Jul. 15, 2011    (DE) .................. 10 2011 079 240

(51) Int. Cl.
F03D 1/06    (2006.01)
B29C 70/42    (2006.01)
(Continued)

(52) U.S. Cl.
CPC ............ F03D 1/0675 (2013.01); B29C 70/42 (2013.01); B29C 70/72 (2013.01); B29C 70/86 (2013.01);
(Continued)

(58) Field of Classification Search
CPC ........ F03D 1/0675; F03D 1/0683; F03D 80/30
(Continued)

(56) References Cited

U.S. PATENT DOCUMENTS 4,626,172 A    12/1986 Mouille et al.
4,648,921 A    3/1987 Nutter, Jr.
(Continued)

FOREIGN PATENT DOCUMENTS

CN    101559652    10/2009
DE    102008055477 A1    6/2009
(Continued)

OTHER PUBLICATIONS

Japanese Office Action dated Mar. 28, 2016 for corresponding Japanese application No. 2014-519449.
(Continued)

*Primary Examiner* — Matthew W Jellett
(74) *Attorney, Agent, or Firm* — Abel Law Group, LLP

(57) ABSTRACT

The invention relates to a device (10) for manufacturing a fiber composite component (3, 4, 5), which is connected to an attachment element (22), for a rotor blade (2) of a wind turbine (1), wherein the fiber composite component (3, 4, 5) is or will be manufactured from at least one fiber material (15, 21) and at least one matrix material, wherein the attachment element (22) is provided with a first region (221) arranged outside of the fiber composite component (3, 4, 5) and a second region (222) integrated into the fiber composite component (3, 4, 5), comprising a manufacturing mold (11) for the fiber composite component (3, 4, 5) with a recess (12), wherein the recess (12) has a first region (121) for receiving the first region (221) of the attachment element (22), and a retention device (13), by means of which fluid matrix material is or will be retained from the first region (121) of the recess (12).

20 Claims, 5 Drawing Sheets

Figure 1:
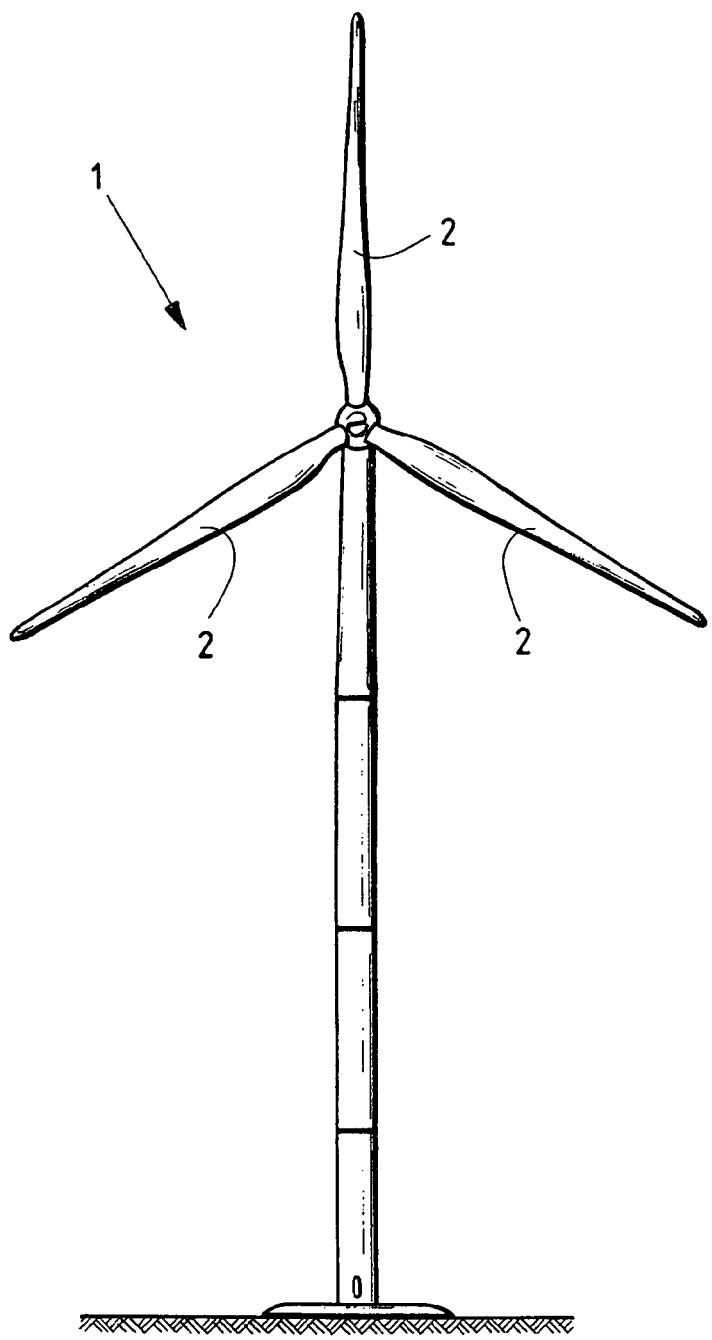

(51) Int. Cl.
*B29C 70/86* (2006.01)
*B29C 70/72* (2006.01)
*F03D 80/30* (2016.01)

(52) U.S. Cl.
CPC .............. *F03D 1/065* (2013.01); *F03D 80/30* (2016.05); *F05B 2230/50* (2013.01); *Y02E 10/721* (2013.01); *Y02P 70/523* (2015.11)

(58) Field of Classification Search
USPC .............................................. 416/146 R, 230
See application file for complete search history.

(56) References Cited

U.S. PATENT DOCUMENTS

| | | | | |
|---|---|---|---|---|
| 7,651,320 | B2* | 1/2010 | Hansen | H02G 13/00 416/1 |
| 8,182,227 | B2* | 5/2012 | Jacobsen | F03D 1/0675 416/146 R |
| 8,191,255 | B2* | 6/2012 | Kristensen | F03D 11/0033 29/889 |
| 8,562,296 | B2* | 10/2013 | Arocena De La Rua | F03D 80/30 415/4.3 |
| 8,622,710 | B2* | 1/2014 | Rindt | F03D 1/0675 416/230 |
| 8,896,980 | B2* | 11/2014 | Kristensen | F03D 11/0033 361/131 |
| 2008/0302469 | A1* | 12/2008 | Erbeck | B29C 45/14467 156/229 |
| 2009/0148655 | A1 | 6/2009 | Nies | |
| 2010/0132270 | A1 | 6/2010 | Willey et al. | |
| 2013/0028739 | A1* | 1/2013 | Erichsen | F03D 80/30 416/146 R |
| 2014/0003953 | A1* | 1/2014 | Zeller | F03D 1/065 416/223 R |
| 2014/0369849 | A1* | 12/2014 | Flach | F03D 1/0675 416/230 |

FOREIGN PATENT DOCUMENTS

| | | |
|---|---|---|
| EP | 1048442 A1 | 11/2000 |
| EP | 1134069 A1 | 9/2001 |
| EP | 1508429 A1 | 2/2005 |
| JP | S50-145473 A | 11/1975 |
| JP | S57-95414 A | 6/1982 |
| JP | S59-199397 A | 11/1984 |
| JP | H11-91457 A | 4/1999 |
| JP | 2011017245 A | 1/2011 |
| WO | 2006128439 A2 | 12/2006 |
| WO | 2009112017 A2 | 9/2009 |

OTHER PUBLICATIONS

Chinese Office Action dated Jun. 26, 2016 for CN 201280034872.9.
Office Action dated Jul. 9, 2014 for German Patent Application No. DE 10 2011 079 240.6.
International Search Report issued in International Application No. PCT/EP2012/002900 dated Dec. 3, 2012.

* cited by examiner

DEVICE AND METHOD FOR MANUFACTURING A COMPONENT FOR ROTOR BLADE LIGHTNING PROTECTION

The invention relates to a device for manufacturing a fiber composite component, which is or will be connected to an attachment part element, for a rotor blade of a wind turbine, wherein the attachment part element is provided with a first region arranged outside of the fiber composite component and a second region integrated into said fiber composite component. Furthermore, the invention relates to a method for manufacturing a fiber composite component for a rotor blade of a wind turbine. Moreover, the invention relates to a fiber composite component for a rotor blade of a wind turbine, a rotor blade of a wind turbine and a wind turbine.

Rotor blades for wind turbines made of several individual parts, which are manufactured individually in a fiber composite design and are glued together to form a rotor blade, are known. Some of the individual parts have large dimensions and are usually planar, i.e. the thickness is considerably smaller than the length and the width.

For the production of large individual parts in a fiber composite design, the so-called vacuum infusion technology is known for example in the state of the art. A dry fiber preform is thereby first laid out in a mold, which determines the final surface shape of the individual part. The mold with the fiber preform is sealed and evacuated, for example by means of vacuum film. The mold is then connected with a supply of resin, which is suctioned into the mold due to the negative pressure prevailing in the mold and saturates the fiber preform there. After the hardening of the resin, the component is then removed from the mold and processed further.

An attachment part, for example a cable or a holding device, is partially fastened or respectively integrated into the individual part during manufacturing on an individual part for a rotor blade. It can hereby be required that the attachment part is accessible from the outside in sections and without damaging the individual part.

It is known in the state of the art to insert the attachment part with the fiber preform and further components for the rotor blade individual part into the manufacturing mold and to seal the manufacturing mold with vacuum film, o wherein those parts of the attachment part that need to be accessible from the outside later on are positioned outside the seal. This method requires a relatively large amount of work and great care in the sealing of the manufacturing mold. Moreover, it can only be used when the attachment part needs to be attached on the side of the rotor blade individual part facing away from the mold.

Alternatively, the rotor blade individual part is first produced without the attachment part, wherein the attachment part is subsequently fastened to the completed rotor blade individual part, for example through adhesive bonding or lamination. This method requires an additional processing cycle and is thus time-consuming and expensive.

The object of the present invention is to specify a device and a method for manufacturing a fiber composite component, which is or will be connected to an attachment part, for a rotor blade of a wind turbine, wherein time-saving and inexpensive manufacturing should be achieved. The object of the invention is also to provide a corresponding component, a corresponding rotor blade and a corresponding wind turbine.

The object is solved through a device for manufacturing a fiber composite component, which is or will be connected to an attachment element, for a rotor blade of a wind turbine, wherein the fiber composite component is or will be manufactured from at least one fiber material and at least one matrix material, wherein the attachment element is provided with a first region arranged outside of the fiber composite component and a second region integrated into the fiber composite component, comprising a manufacturing mold for the fiber composite component with a recess, wherein the recess has a first region for receiving the first region of the attachment element, and a retention device, by means of which fluid matrix material from the first region of the recess is or will be retained. Thereupon, additional material components for the fiber composite component, in particular at least one fiber material, for example fabric, non-woven fabric or rovings made of glass, carbon or plastic fibers, are incorporated into the manufacturing mold and moistened or respectively saturated with fluid matrix material, for example resin, synthetic resin or cast resin. After the hardening of the matrix material a fiber composite component is provided, in which the fibers of the fiber material are or respectively will be embedded into a matrix made of hardened matrix material.

It is achieved through the invention that, together with the fiber material, in particular also the second region of the attachment element is or will be embedded into the matrix of the fiber composite component and thus integrated into the fiber composite component, while the first region of the attachment element does not come in contact with the matrix material and thus remains outside of the matrix.

Within the framework of the invention, the design of the recess is adjustable for the respective requirements of the individual case. Thus, it is for example conceivable that the recess in the first region represents a penetration through the manufacturing mold, wherein the first region of the attachment element is or will be arranged at least partially outside of the manufacturing mold. In this case, only a first region of the recess and a suitable seal are needed, which are relatively small compared to the first region of the attachment element.

The invention has the advantage that the attachment element is integrated during the manufacture of the fiber composite component in the desired manner, wherein in contrast to the manufacture of a comparable fiber composite component without an integrated attachment element only simple and less complicated additional manufacturing steps, namely the insertion of the attachment element into the manufacturing mold and the region-wise sealing of the recess, are needed.

A further advantage is that the positioning of the attachment element is or respectively will be specified by the recess in the manufacturing mold. Both a more exact positioning of the attachment element and an improved reproducibility of the position of the attachment element are thereby enabled with respect to the known manufacturing methods described above.

The recess preferably has a second region for receiving the second region of the attachment element, in order to further strengthen this advantageous side effect.

Furthermore, it is preferably provided that the retention device is designed as a seal, by means of which the first region of the recess is or will be sealed impermeably for flowable matrix material.

Within the framework of the invention, a seal is understood in particular as a barrier, which mainly prevents the penetration of flowable matrix material into the first region of the recess so that the matrix of the fiber composite component does not extend onto this region. The seal is created for example through insertion of a sealing body adjusted to the recess or through at least partial filling of the recess or respectively the first region of the recess with a sealing mass.

An advantageous further embodiment of the invention under certain circumstances furthermore provides that the retention device for the first region of the recess is designed in a reusable manner, A reusable retention device or seal is provided for example in that the first region of the recess is sealed during the manufacture of a first fiber composite component by means of a sealing mass, wherein the sealing mass is designed to harden or be hardened. A sealing body is thereby provided, which is available for the manufacture of another identically constructed fiber composite component.

A particularly preferred embodiment of the invention provides that the retention device for the first region of the recess is made of silicone. This material can be used particularly flexibly and enables in particular both the use and as a sealing mass as well as the formation of a sealing body.

In the case of a preferred embodiment of the invention, a cover is also provided, by means of which the second region of the recess is or will be covered in a permeable manner at least partially for flowing matrix material. The cover is or respectively will be thereby integrated or respectively incorporated into the matrix of the fiber composite component like the second region of the attachment element. The cover prevents fiber material for the fiber composite component from lowering into the recess, from forming folds or faults or from shifting otherwise in the mold, which would under certain circumstances lead to changed mechanical properties of the fiber composite component.

It is also particularly advantageous when a top side of the retention device for the first region of the recess and/or a top side of the cover for the second region of the recess mainly represent a continuation of an inner surface of the manufacturing mold for the recess.

It is also advantageous if the recess and/or the retention device for the first region of the recess and/or the cover for the second region of the recess are or respectively are designed at least in sections complementary in shape to the attachment element. An improved positioning of the attachment element and a simplified lateral seal of the first region of the recess are hereby enabled.

The cover for the second region of the recess is designed for example as a hard fiber board. This type of cover is easy to work with and adjust, inexpensive and light.

The object is also solved through a method for manufacturing a fiber composite component, which is or will be connected with an attachment element, for a rotor blade of a wind turbine, wherein the fiber composite component is or will be made of at least one fiber material and at least one matrix material, wherein the attachment element is provided with a first region arranged outside of the fiber composite component and with a second region integrated into the fiber composite component, comprising the following process steps:
  Insertion of the attachment element into a manufacturing mold for the fiber composite component with a recess, wherein the first region of the attachment element is or will be arranged in a first region of the recess,
  Sealing of the first region of the recess from flowing matrix material,
  Introduction of fiber material and flowable matrix material for the fiber composite component into the manufacturing mold.

Thereupon, additional material components for the fiber composite component, in particular at least one fiber material, for example fabric, nonwoven fabric or rowings made of glass, carbon or plastic fibers, are incorporated into the manufacturing mold and moistened or respectively saturated with fluid matrix material, for example resin, synthetic resin or cast resin. After the hardening of the matrix material, a fiber composite component is then provided, in which the fibers of the fiber material are or respectively will be embedded into a matrix made of hardened matrix material.

The fiber composite component is removed from the manufacturing mold together with the attachment element and is now available for further processing. It is thereby particularly conceivable that the first region of the attachment element is released from the seal and is distanced if applicable at least partially from the fiber composite component. The seal can also be removed from the fiber composite component.

The method according to the invention is for example thereby further characterized in that at least one part of the fiber material is or will be arranged below the second region of the attachment element in the manufacturing mold. An additional reinforcement for the connection between the fiber composite component and attachment element is hereby provided, whereby a release or breaking out of the attachment element is made difficult.

Particularly preferably, the second region of the attachment element is or will be arranged in a second region of the recess, wherein in particular the second region of the recess is or will be covered in a permeable manner at least partially for flowing matrix material.

In a particularly preferred embodiment of the method according to the invention, it is also provided that the first region of the recess is or will be sealed using silicone.

The object is also solved through a fiber composite component, in particular a rotor blade web, for a rotor blade of a wind turbine, wherein an attachment element is provided with a first region arranged outside of the fiber composite component and with a second region integrated into the fiber composite component, obtainable by executing the method according to the invention described above.

The object is also solved through a rotor blade for a wind turbine with a fiber composite component according to the invention, which is for example a rotor blade web, as well as through a wind turbine with a rotor blade according to the invention. In the case of a rotor blade according to the invention, the attachment element is for example part of a lightning protection device, in particular a lightning protection cable.

Figure 2:
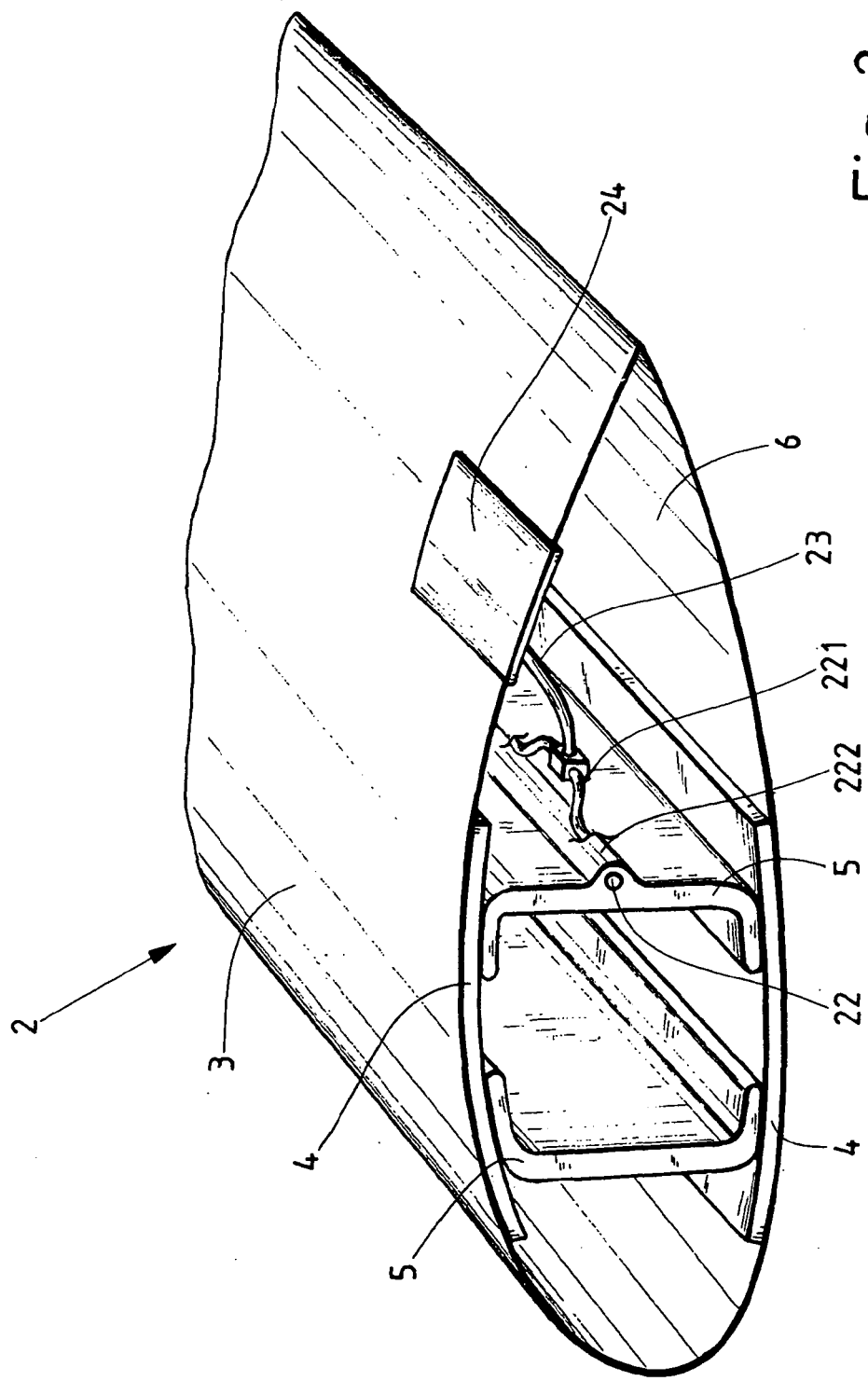
Figure 3:
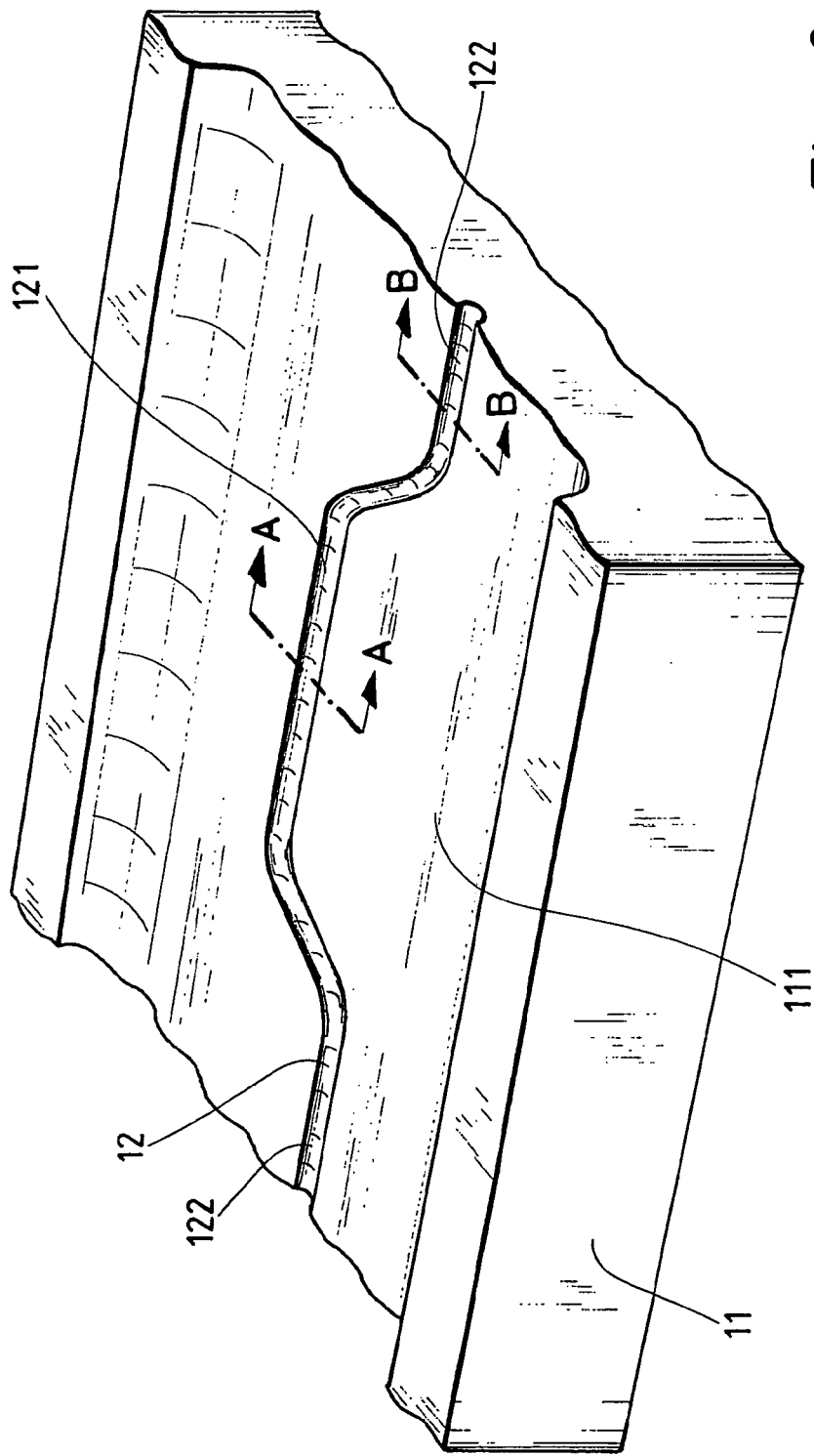
Figure 4A:
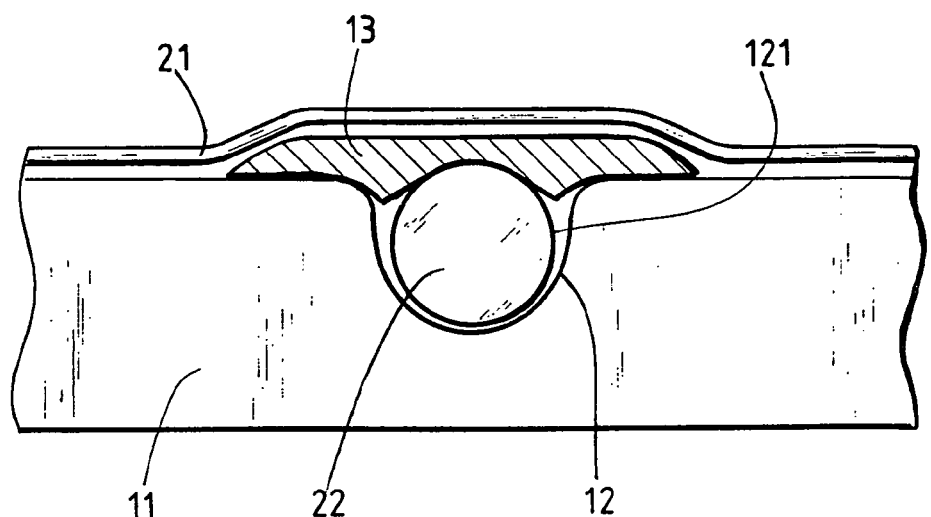
Figure 4B:
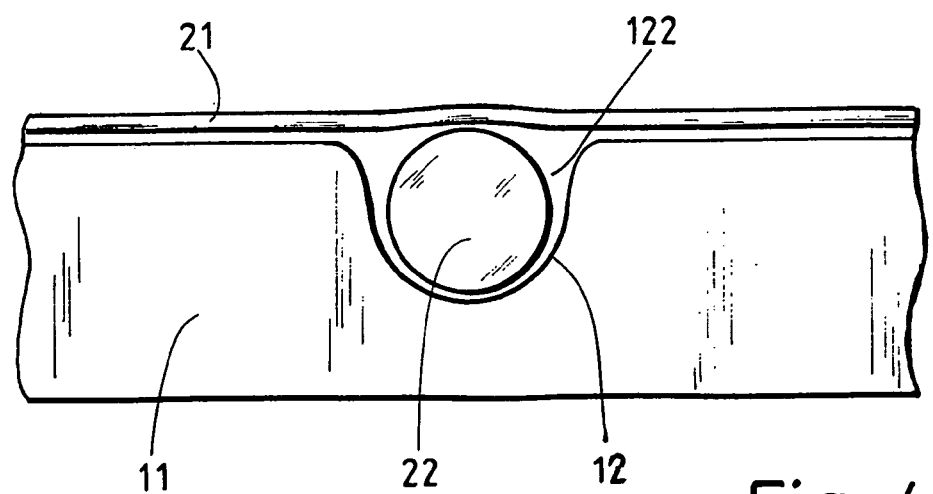
Figure 5A:
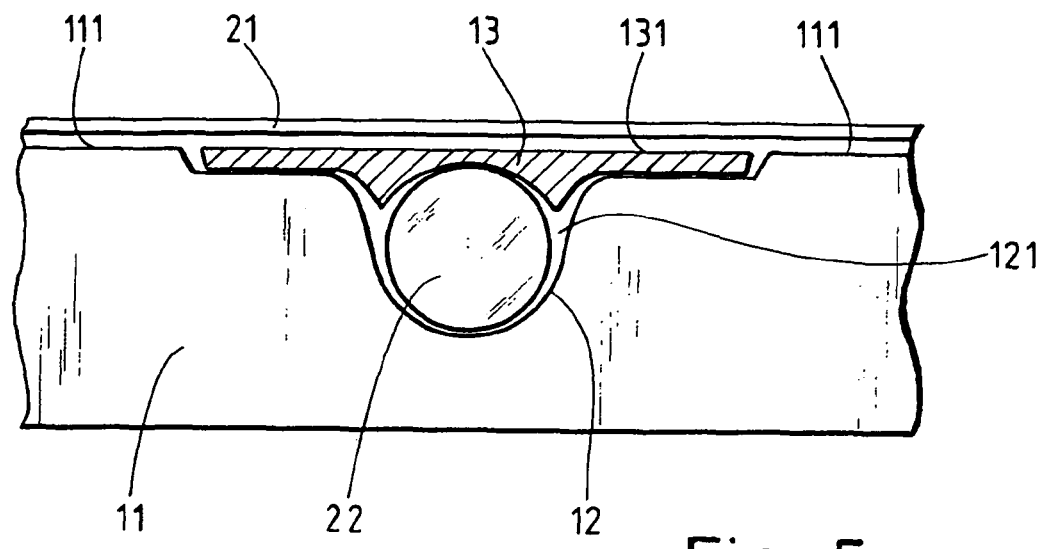
Figure 5B:
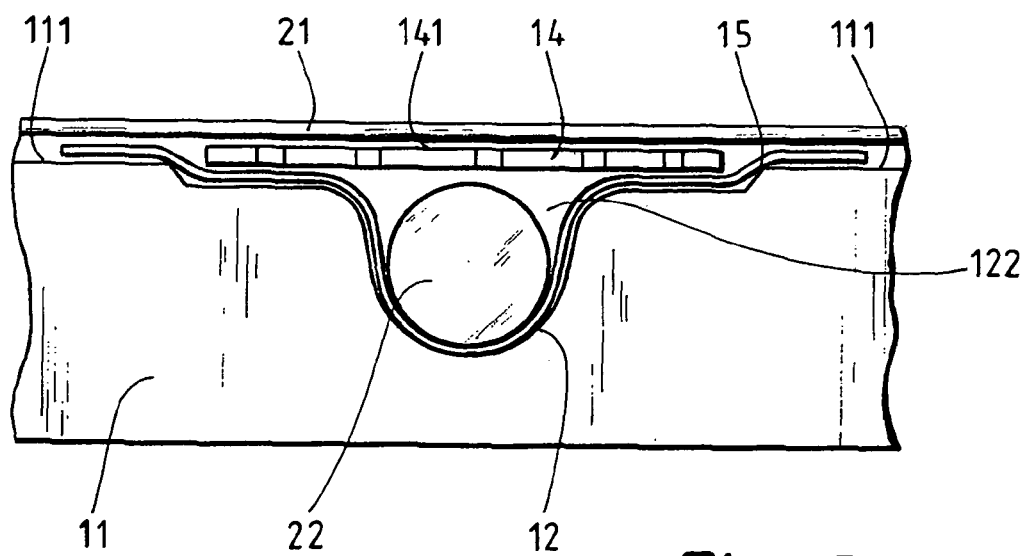

The invention is described below, without restricting the general intent of the invention, based on exemplary embodiments in reference to the drawings, whereby we expressly refer to the drawings with regard to the disclosure of all details according to the invention that are not explained in greater detail in the text. In the figures FIG. 1 shows schematically a wind turbine, FIG. 2 shows schematically a perspective sectional representation through an exemplary rotor blade of a wind turbine according to the invention, FIG. 3 shows schematically an exemplary manufacturing mold of a device according to the invention for manufacturing a fiber composite component for a rotor blade of a wind turbine, FIG. 4a shows schematically a sectional representation of the manufacturing mold from FIG. 3 along the line A-A, FIG. 4b shows schematically a sectional representation of the manufacturing mold from FIG. 3 along the line B-B, FIG. 5a shows schematically a sectional representation analogous to the representation in FIG. 4a for another embodiment of a manufacturing mold of an inventive device for manufacturing a fiber composite component and FIG. 5b shows schematically a sectional representation analogous to the representation in FIG. 4b for another embodiment of a manufacturing mold of an inventive device for manufacturing a fiber composite component.

In the following figures, the same or similar types of elements or respectively corresponding parts are provided with the same reference numbers in order to prevent the item from needing to be reintroduced.

FIG. 1 shows a typical wind turbine 1 with three rotor blades 2, wherein the invention is not restricted to wind turbines of the type shown as an example. A perspective sectional representation of one of the rotor blades 2 is shown in FIG. 2.

The supporting structure of the exemplary rotor blade 2 is made of two rotor blade belts 4 and two rotor blade webs 5, which are glued to form a spar box. This spar box supports the rotor blade shell 3, which determines the aerodynamic properties of the rotor blade 2. In the rear hollow space of the rotor blade 2, the rear box 6, parts of a lightning protection device are represented.

The lightning protection system comprises a receptor 24, which is integrated into the rotor blade shell 3 in order to not impair the aerodynamic properties of the rotor blade 2. The receptor 24 is grounded via a connection cable 23 as well as a lightning protection cable 22 running longitudinally in the rotor blade.

The lightning protection cable 22 is integrated with a second section or region 222 into one of the rotor blade webs 5, wherein a loop or respectively a first region or section 221 of the lightning protection cable 22 is provided outside of the rotor blade shear web 5, in order to connect the connection cable 23 to the lightning protection cable 22.

An exemplary manufacturing mold 11 for the exemplary rotor blade web 5 is shown with the lightning protection cable 22 integrated in sections in FIG. 3, wherein only a section of the manufacturing mold 11 is shown.

The manufacturing mold 11 mainly consists of a tank-like base structure, which has the shape of the rotor blade web 5. In the shown example, the manufacturing mold 11 has a mainly flat surface 111 with elevated side edges. In the manufacturing mold 11, a recess 12 is provided for the lightning protection cable 22. The recess 12 comprises straight sections 122 mainly parallel to the longitudinal extension of the manufacturing mold 11 and a bend 121. The lightning protection cable 22 should be integrated so with its sections or respectively regions 22 arranged in the straight regions 122 into the rotor blade web 5, while the regions 221 of the lightning protection cable 22, which are placed in the bend 121 during manufacturing, should form a loop outside of the rotor blade shear web 5.

Such a loop is also enabled with a manufacturing mold 11, in which the recess 12 progresses straight over the entire length of the manufacturing mold 11, wherein instead of the bend 121, a region 121 with a penetration through the manufacturing mold 11 is provided. This penetration now leads the section 221 of the lightning protection cable provided for the loop out of the manufacturing mold 11 so that only the relatively short region 121 of the recess 12 with the penetration needs to be sealed. The advantage of this embodiment is that that loops with different lengths are realizable with a manufacturing mold 11 or respectively a recess 12.

FIG. 4a shows a sectional representation of the manufacturing mold 11 shown in FIG. 3 along the line A-A, i.e. in the region of the bend 121 of the recess 12. Some of the materials that are placed in the manufacturing mold 11 during the manufacturing process are also shown.

In this exemplary embodiment, the recess 12 mainly represents a channel with a semicircular floor, which extends along the entire manufacturing mold 11 and is adjusted in the profile to the diameter of the lightning protection cable 22. A seal 13 prevents resin or other matrix material from flowing into the channel from above. On the edge regions of the bend 121, the seal 13 is also designed such that a lateral penetration of flowing matrix material along the recess 12 is also prevented.

The surface 111 of the manufacturing mold 11 and the top side 131 of the seal 13 form a common surface, on which the other materials, in particular fiber material and filling materials, are now placed for the rotor blade web 5. FIG. 4a shows an example of a single layer of fiber material 21, which is for example a first layer of a plurality of layers for the rotor blade web 5.

FIG. 4b shows a comparable sectional representation along the line B-B from FIG. 3, i.e. for the straight region 122 of the recess 12. The recess 12 here has for example the same cross-section as in the bend 121. This section or respectively region 122 of the recess 12 is or respectively will not be sealed so that matrix material introduced to the manufacturing mold 11 fills up the recess 12 in the said region 122 and thus encloses the lightning protection cable 22.

Another exemplary embodiment for the profile of the recess 12 is shown in FIGS. 5a and 5b. Analogous to FIG. 4a, FIG. 5a shows a region 121, in which the lightning protection cable 22 is arranged outside of the rotor blade web 5, wherein FIG. 5b shows a region 122 analogous to FIG. 4a, in which the lightning protection cable 22 is or respectively should be integrated into the rotor blade web 5.

The profile of the recess 12 shows in addition to a channel for the lightning protection cable 22 a flatter and wider channel, which extends on both sides of the channel. This channel has the particular advantage that there are sufficient supporting and sealing surfaces available for the seal 13 without the top side 131 of the seal 13 protruding beyond the surface 111 of the manufacturing mold 11. Compared to the exemplary embodiment according to FIG. 4a, it is thereby enabled that the fiber material 21 for the rotor blade web 5 is placed in a flat manner.

The profile of the recess 12 shown in FIG. 5a can also be used in the region 122 of the recess 12, in which the lightning protection cable 22 is or should be integrated into the rotor blade shear web 5. This scenario is shown as an example in FIG. 5b.

A cover 14 is thereby provided for the recess 12, which is designed for example as a hard fiber board and is adjusted in thickness and width to the channel of the recess 12. The top side 141 of the cover 14 and the surface 111 of the manufacturing mold thereby form an even surface, whereby a flat placement of the fiber material 21 for the rotor blade shear web 5 is enabled.

Another layer of fiber material 15 is also shown in FIG. 5b, which is arranged below the lightning protection cable 22 and the cover 14 and primarily reinforces the integration region of rotor blade shear web 5 and lightning protection cable 22.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

LIST OF REFERENCES

1 Wind turbine
2 Rotor blade
3 Rotor blade shell
4 Rotor blade belt
5 Rotor blade web
6 Rear box
11 Manufacturing mold
111 Surface
12 Recess
121 First region (recess)
122 Second region (recess)
13 Seal
131 Top side
14 Cover
141 Top side
15 Fiber material
21 Fiber material
22 Attachment element
23 Connection cable
24 Receptor
221 First region (attachment element)
222 Second region (attachment element)

The invention claimed is:

1. A device for manufacturing a fiber composite component, which is connected to an attachment element, for a rotor blade of a wind turbine, wherein said fiber composite component is manufactured from at least one fiber material and at least one flowable matrix material, wherein said attachment element is provided with a first region arranged outside of said fiber composite component and a second region integrated into said fiber composite component, said device comprising:
a manufacturing mold for said fiber composite component including a recess, wherein said recess has a first region comprising a bend for receiving said first region of said attachment element to form a cable loop for lightning protection, and a retention device that prevents said flowable matrix material from entering said first region of said recess and from contacting said first region of said attachment element; and
a second region of said recess for receiving said second region of said attachment element permitting said second region of said attachment element to be embedded in said flowable matrix material.

2. The device according to claim 1, wherein said retention device is a seal, by means of which said first region of said recess is sealed impermeably against said flowable matrix material.

3. The device according to claim 1, wherein said retention device is reusable.

4. The device according to claim 1, wherein said retention device is made of silicone.

5. The device according to claim 1, comprising a permeable cover that covers said second region of said recess which said flowable matrix material permeates.

6. The device according claim 5, wherein at least one of a top side of said retention device for said first region of said recess and a top side of said cover for said second region of said recess mainly represents a continuation of an inner surface of said manufacturing mold near said recess.

7. The device according to claim 5, wherein at least one of said recess, said retention device for said first region of said recess and said cover for said second region of said recess include at least sections complementary in shape to said attachment element.

8. The device according to claim 5, wherein said cover for said second region of said recess is a hard fiber board.

9. A fiber composite rotor blade web, for a rotor blade of a wind turbine, wherein the fiber composite rotor blade web is made of at least one fiber material and at least one flowable matrix material and comprises an attachment element provided with a first region arranged outside of said fiber composite rotor blade web and a second region integrated into said fiber composite rotor blade web, said fiber composite rotor blade web being made by a method comprising the following steps:
providing a manufacturing mold for the fiber composite rotor blade web including a recess, wherein said recess has a first region arranged as a loop for receiving said first region of said attachment element, and a retention device,
inserting said attachment element into said manufacturing mold, wherein said first region of said attachment element is arranged in said first region of said recess,
sealing with said retention element said first region of said recess which prevents said flowable matrix material from contacting said first region of said attachment element,
introducing said fiber material and said flowable matrix material into the manufacturing mold while preventing said flowable matrix material from contacting said first region of said attachment element;
providing a second region of said recess for receiving said second region of said attachment element, arranging said second region of said attachment element in said second region of said recess, introducing said fiber material and said flowable matrix material into the manufacturing mold so as to integrate said second region of said attachment element in said matrix material, wherein said second region of said recess is covered at least partially permitting permeation of said flowable matrix material.

10. The fiber composite rotor blade web according to claim 9, comprising arranging at least one part of the fiber material below said second region of said attachment element in said manufacturing mold.

11. The fiber composite rotor blade web according to claim 9, comprising sealing said first region of said recess using silicone.

12. A rotor blade for a wind turbine comprising said fiber composite rotor blade web according to claim 9.

13. The rotor blade according to claim 12, wherein said attachment element is a part of a lightning protection device for the rotor blade.

14. A wind turbine with said rotor blade according to claim 12.

15. A wind turbine with said rotor blade according to claim 13.

16. A device for manufacturing a fiber composite component of a rotor blade of a wind turbine in which a lightning protection cable is disposed, wherein said fiber composite component is formed of at least one fiber material and at least one matrix material, wherein said lightning protection cable is provided with a first region arranged as a loop outside of said fiber composite component and a second region integrated into said fiber composite component extending longitudinally along a length of said rotor blade, comprising:

a manufacturing mold for manufacturing said fiber composite component including a recess, wherein said recess has a first region for receiving said first region of said lightning protection cable extending as said loop, a seal which prevents flowable said matrix material from entering said first region of said recess so that said first region of said lightning protection cable is not in contact with said flowable matrix material, and a second region of said recess for receiving said second region of said lightning protection cable and permitting said second region of said lightning protection cable to be integrated into said matrix material.

17. The device of claim 1 including multiple fiber layers of said fiber material, one of said fiber layers being in contact with said retention device.

18. The fiber composite rotor blade web of claim 9 wherein said fiber composite component includes multiple fiber layers of said fiber material comprising applying one of said fiber layers into contact with said retention device.

19. The device of claim 16 including multiple fiber layers of said fiber material, one of said fiber layers being in contact with said seal.

20. A rotor blade of a wind turbine with lightning protection, comprising:

a rotor blade shell;

a fiber composite component that is positioned as an interior support of said rotor blade shell, wherein said fiber composite component is formed of at least one fiber material and at least one matrix material and extends along a length of said rotor blade;

a lightning protection cable including a first region arranged as a loop outside of said fiber composite component and a second region integrated into said fiber composite component extending longitudinally along the length of said rotor blade, said lightning protection cable being adapted to be grounded;

a receiver positioned on an exterior surface of said rotor blade and being electrically conductive;

an electrical connector fastened as part of said loop, and no other components being in contact with said loop in said rotor blade shell; and an electrical conductor extending from said receiver to said electrical connector.

* * * * *